Feb. 5, 1957      C. S. EVANS      2,780,386
FROZEN SEAL RECEPTACLE
Filed July 10, 1950
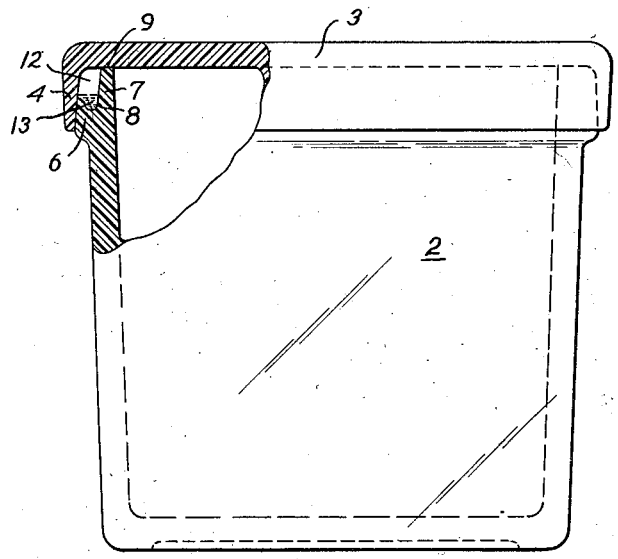
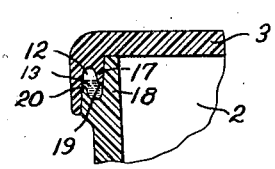
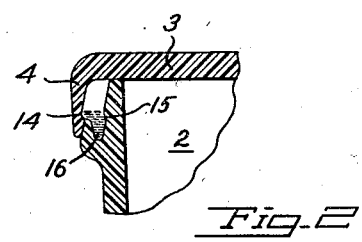
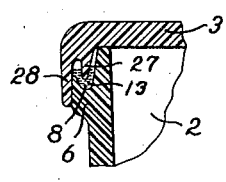
INVENTOR
Charles S. Evans

United States Patent Office 2,780,386
Patented Feb. 5, 1957

2,780,386

FROZEN SEAL RECEPTACLE

Charles S. Evans, Atherton, Calif.

Application July 10, 1950, Serial No. 172,917

2 Claims. (Cl. 220—45)

My invention relates to generally small receptacles for the storage of food in domestic frozen food cabinets; and the principal object of the invention is to provide such a receptacle which embodies simple and easily applied means for sealing it hermetically. Another object is the provision of such a receptacle in which the sealing means includes a small amount of clean water. Another object of the invention is to provide such a receptacle embodying means by which the closure is sealed air tight and the closure locked on automatically during the period of refrigeration, but is automatically released upon removal of the receptacle from low temperature.

My invention possesses other objects and features of value, some of which, with the foregoing, will be set forth in the following description of my invention. It is to be understood that I do not limit myself to the showing made by the said description, and the drawings, as I may adopt variant forms of my invention within the scope of the appended claims.

Referring to the drawings: Fig. 1 is an elevation, partly in section, of one of my frozen seal receptacles. Figs. 2, 3 and 4 are fragmentary views in vertical section showing varying forms of the sealing joint.

With the advent of the deep freeze process, frozen food cabinets have come into common use, especially for the home, where their convenience and economy have made them hardly less desirable than the refrigerator. While some fruits, vegetables and meats do not seem to lend themselves to preserving by freezing, the process is eminently satisfactory for most food articles; and to a considerable extent has already replaced the more arduous heat canning procedures, not only because of the saving of labor and time, but because of the preservation of the natural flavors.

However the processing of raw fruits, vegetables and meat during seasonal plenty is only a part of the useful function performed by a deep freeze cabinet in the home. Pies, cakes, bread, left-over portions of almost any sort of food, cooked or uncooked, if properly sealed can be kept in perfect original condition almost indefinitely. Air tight sealing is however an essential condition for perfect preservation. Merely tight wrapping or ordinary lid closures are not enough, even at sub-zero temperatures, because while the growth of bacteria and molds may be inhibited by low temperature, the evaporation of moisture continues, effecting a fundamental change in cell structure and ruining flavor. There is still another objection to the withdrawal of moisture from food in low temperature boxes. Such moisture, unless removed by means which add complications to the apparatus, will collect as frost or snow-like ice on the inside walls of the cabinet, requiring periodic removal to maintain efficiency of the cooling coils.

Several methods of obtaining hermetic sealing are in use, screw-top receptacles with deformable gaskets, friction-top receptacles with sticky tape applied over the joint and plastic sheet wrapping sealed with a hot iron. These are all good if properly done, but the screw-top containers are expensive in first cost and in renewal of gaskets, besides being bulky for the amount of food contained. In addition they present the usual difficulty of turning on and twisting off a tight closure. The taped-joint container requires new tape with each use and both sealing and opening impose difficulties and inconvenience on ordinary fingers. The plastic sheet wrapping and hot iron sealing is expensive since a wrap can be used but once. It requires careful application and manipulation of the hot sealing iron, and while probably the most efficient in point of bulk per unit of contents, it is undoubtedly the most difficult to apply properly. Obviously a wrap is not suitable for anything not possessed of a stable form.

With the above in mind as marking limitations which are to be avoided, I have sought to provide a nearly rectangular container of moderate first cost, capable of infinite reuse, and in which sealing and unsealing is accomplished automatically by the temperature change which takes place when the container is placed in the deep freeze cabinet or taken out of it. This is made possible by the use of a few drops of water so retained in a recess or trough adjacent the line of sealing between the body of the container and its closure, that the joint is sealed by the ice which the water forms when the container is subjected to low temperature, and conversely unsealed when the container is again exposed to room temperature. In order to prevent depletion of the water or ice by evaporation, with consequent frosting of the cabinet, means are provided for enclosing the sealing water within the boundaries of the container by means of a snug slip joint between closure and the container body, and this joint also is sealed by the freezing water.

Since water expands roughly about 9% on freezing, and air contracts in proportion to the drop in temperature, advantage is taken of these phenomena in designing my containers. The metal aluminum or one of the plastics is satisfactory for the container body and lid. Clean cold water from the kitchen tap is the sealing medium.

In Fig. 1, I have shown a small receptacle of generally cubical shape having a volume of between 35 and 40 cubic inches. This size and one of the same width and height but twice as long are favorite sizes in the small family home, and are a convenient size for the storage and preservation of all manner of food stuffs, including fresh fruits. Because of its rectangular shape it packs closely with good utilization of space yet provides enough space between the sides for cold air to reach all parts. The slight taper is to facilitate the molding process. The same view could of course represent a round receptacle or jar slightly tapering toward its base. Such a shape however, because of the vacant spaces between the receptacles is wasteful of storage space.

The receptacle comprises two parts, a body 2 and a cover 3. The cover is formed with a down-turned flange 4, slightly tapered to snugly engage the tapered bead 6, extending outwardly around the upper margin 7 of the receptacle, and forming therewith a shallow trough or gutter 8. The shape and size of the trough are of great importance and must have a close though not critical relation to the vertical height of the margin 7.

The parts are so proportioned that when the cover is pressed firmly down on the body of the receptacle, the inner face of the flange 4 snugly engages the complementary outer face of the bead 6 all around the receptacle, at which time the top face or rim 9 of the margin is touching or almost touching the under side of the cover. This leaves an air space 12 between cover and main body and immediately above the trough 8; and this space is in communication with the inside of the receptacle through the very narrow space between cover and marginal rim 9. It will be understood of course that even if the cover makes actual contact with the marginal rim, the joint so formed would permit the passing of air, especially if under even a slight degree of pressure.

If the trough 8 is filled with water, the cover pressed firmly into place and the receptacle placed in the deep freeze cabinet, the water will freeze, meanwhile increasing in bulk about 9% so that the inner side of the joint between the bead 6 and the flange 4 is submerged and sealed with ice 13 without the ice being exposed to the atmosphere outside of the receptacle, and therefore not subjected to depletion by evaporation.

As the low temperature expands the water in the trough, it contacts the air in the air space 12, but such space is reduced by the greater bulk of the ice. These two occurrences do not quite balance each other; and usually a very small interchange of air will take place between the air space 12 and the larger space within the body of the receptacle, so that differences in pressures on opposite sides of the margin wall are equalized by flow through the rim joint.

In Figs. 2, 3 and 4 variant forms of the above described structure are shown. In Fig. 2, shallow recesses 14 and 15 in the cover flange 4 and margin wall, permit the ice seal 16 to form an interlock between the body 2 of the receptacle and the cover 3.

Fig. 3 shows a cover 3 with an inner flange 17 forming an inner snug slip fit with the sloping outer face of the margin wall 18. The parts are so proportioned that when the cover is pressed into place the lip 19 is substantially opposite the lip 20 of the trough, and the ice seals both joints. The slight change in air pressure in the chamber 12 may be ignored.

In Fig. 4, a double seal structure is also shown. A depending flange 27 on the cover 3 inside the main perimeter flange 28 extends into the trough 8, so that the ice forms around it and forms an inner seal in addition to the outer seal between the outer flange 28 and the bead 6.

In using my frozen seal receptacle, it is only necessary to set the receptacle body on a substantially level surface, and with a tablespoon, fill the trough so that it overflows. The cover is then pressed into place, and the closed receptacle set in level position in the deep freeze cabinet. After the ice seal has formed, the receptacle may be freely handled and packed in any position permitted by the contents of the receptacle.

When the receptacle is to be opened, it may be allowed to stand for a time at room temperature, or held for a moment under a stream of warm water. This melts the ice seal and permits removal of the cover. The receptacle may then be tipped enough to allow the trough to empty without disturbing the frozen contents, or in many cases the very small amount of clean water can be ignored. It will be noted that because of the shapes of the parts adjacent the seal and because water is the sealing medium, the cleansing of the receptacle for reuse involves no more than the simple washing and drying of a dish.

I claim:

1. A frozen seal receptacle comprising a main body portion having an upstanding peripheral wall, an external bead extending around said wall below its rim and forming therewith an upwardly widening water trough having a continuous upwardly converging outer face, a cover portion having a flange entirely enclosing the bead and trough said flange having an inner surface in face contact relation with the outer face of the trough, and a body of ice in the trough completely filling the trough and extending slightly beyond the upper edge of the outer wall of the trough and sealing the joint between said flange and said outer face.

2. The combination according to claim 1, in which said cover is provided with an inner flange extending into the trough.

References Cited in the file of this patent
UNITED STATES PATENTS

| | | |
|---|---|---|
| 245,026 | Swab | Aug. 2, 1881 |
| 313,463 | Woolsey | Mar. 8, 1885 |
| 584,660 | Arnot | June 15, 1897 |
| 586,636 | Sullivan | July 20, 1897 |
| 643,230 | Maller | Feb. 13, 1900 |
| 1,459,437 | Bowman | June 19, 1923 |
| 1,559,013 | Smith | Oct. 27, 1925 |
| 1,621,257 | Knowlton et al. | Mar. 15, 1927 |
| 1,680,060 | Nelson | Aug. 7, 1928 |
| 2,550,815 | Inwood | May 1, 1951 |